Figure 1:
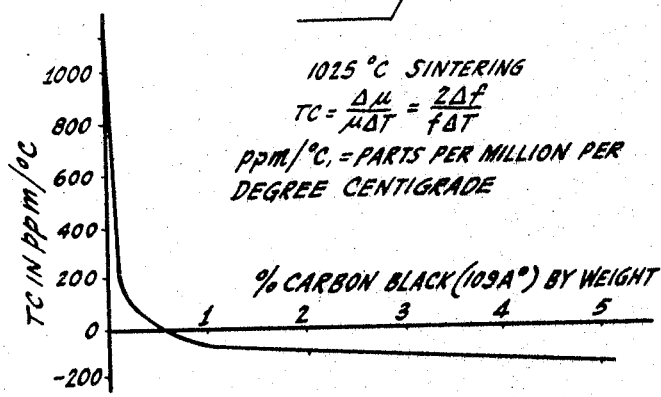

3,043,777
METHODS FOR PREPARING IMPROVED MAGNETIC BODIES

Howard Lessoff, Milton, Robert Laird, Lawrence, and James D. Childress, Maynard, Mass., assignors to Radio Corporation of America, a corporation of Delaware Filed Dec. 31, 1958, Ser. No. 784,163
8 Claims. (Cl. 252—62.5)

This invention relates to methods for preparing improved magnetic bodies and particularly, but not necessarily exclusively, to methods for preparing magnetic bodies of sintered ferrite crystallites having low temperature coefficients of initial permeability.

The term "ferrite" as used herein refers to a class of inorganic compounds having a spinel structure and the molar formula $M^{2+}(M^{3+})_2O_4$, where $M^{2+}$ may be one or more divalent cations and $M^{3+}$ may be one or more trivalent cations, one of which is iron.

Magnetic bodies consisting essentially of sintered ferrite crystallites, also referred to herein as "ferrite bodies," are useful in many electronic devices. For uses as cores in antennas, inductors, transformers, and low loss applications, where the operating temperature varies, it is important to maintain a uniform value of initial permeability over the range of operating temperatures. Other uses for ferrite crystallites are in square loop and magnetostriction applications where improvements both in squareness and temperature-frequency response of magnetostriction are desirable.

In most ferrite bodies, the initial permeability varies widely with changes in temperature. The measure of this variation is referred to herein as the temperature coefficient of initial permeability; and is measured as the change in initial permeability with temperature in parts per million per degree centigrade over the range of temperature under consideration. A typical temperature coefficient of initial permeability for a nickel zinc ferrite is about 1000 parts per million per degree centigrade (p.p.m./° C.) at 4.3 megacycles over the temperature range —50 to 130° C. Such a variation materially affects the operating characteristics of the equipment in which the body is incorporated.

An object of this invention is to provide methods for preparing magnetic bodies of sintered ferrite crystallites.

A further object is to provide methods for preparing magnetic bodies having improved magnetic characteristics.

The methods of the invention comprise the usual methods for preparing magnetic bodies of sintered ferrite crystallites except that carbon black in a proportion up to 10 weight percent is added to and mixed with the batch of raw materials prior to forming and sintering to produce a ferrite body. The particles of carbon black may have a mean particle size up to 1000 A., preferably between 100 and 500 A. In a typical process, the raw materials of the raw batch are mixed in the desired proportions together with up to 10 weight percent of carbon black. A portion of the mixture is formed to a desired shape, and then heated to an elevated temperature. During the heating, the carbon black is completely volatilized by oxidation, and ferrite crystallites are produced and sintered into a coherent body.

By including carbon black in the raw batch, the temperature coefficient of initial permeability of many sintered ferrite bodies is reduced to a low value. In a typical situation, the temperature coefficient of initial permeability of a magnetic body of the invention prepared with carbon black is about 1/10 the value of that of a similar magnetic body prepared without carbon black. In other ferrite bodies, other magnetic properties such as squareness of hysteresis loop for memory devices are improved.

Figure 2:
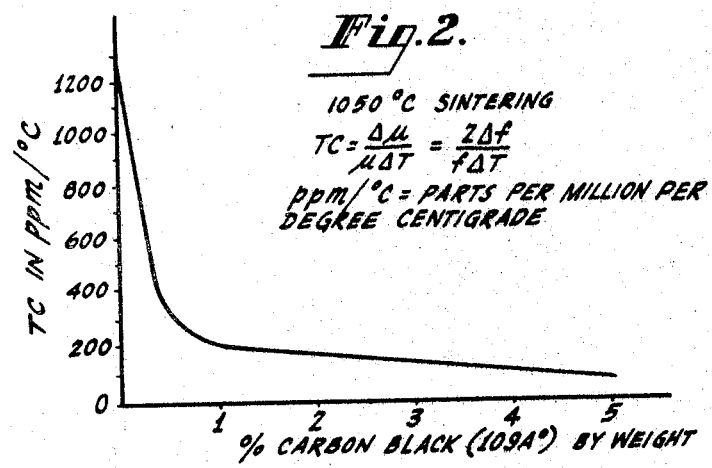
Figure 3:
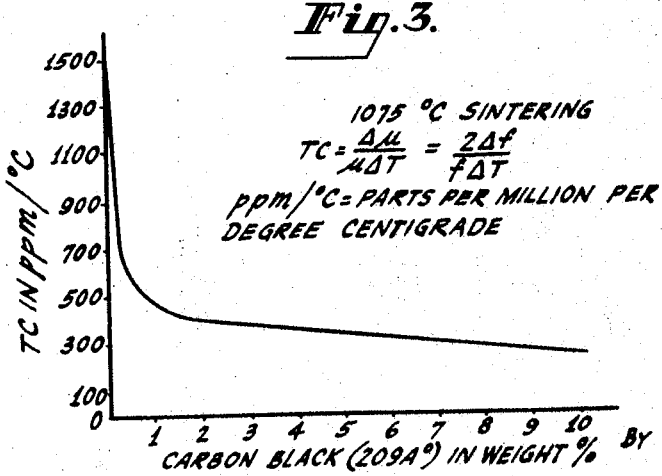

The novel features of the invention are set forth in greater detail in the following description in conjunction with the accompanying drawing in which:

FIGURES 1, 2 and 3 are graphs comparing the temperature coefficient of a body with the weight percent carbon used to prepare the body according to the invention at sintering temperatures of 1025° C., 1050° C. and 1075° C. respectively.

EXAMPLE

Pure, fine-particle oxides are rough mixed as a raw batch in the molar proportions as follows:

0.276 mol nickelous oxide, NiO
0.222 mol zinc oxide, ZnO
0.002 mol cobaltous oxide, CoO
0.500 mol ferric oxide, $Fe_2O_3$
0.005 mol molybdenum trioxide, $MoO_3$ To the foregoing raw batch is added 0.1 weight percent carbon black (mean particle size about 106 A.). The raw batch is then intimately mixed. Intimate mixing is accomplished by wet ball milling; i.e., tumbling a water slurry of the mixture of oxides with porcelain balls in a closed porcelain jar for about one hour. The mixed slurry is dried at about 200° C., and the dried material is ground and sieved to a fine powder. The dried material may be calcined if desired. In this example, the calcining step is omitted. For each 100 grams of calcined powder, 1 gram of a low molecular weight solid polyethylene glycol, such as Carbowax 1000, Union Carbide and Carbon Corp., New York, N.Y., and 4 grams Trigamine stearate emulsified in hot water is added. Trigamine is the trademark of an emulsifying agent marketed by Glyco Products Company, Inc., Brooklyn, New York. These constituents are mixed together using additional water if necessary to obtain a uniform distribution of the added material. The water is evaporated by heating at about 75° C. and the dry material is sieved to the desired aggregate size.

Portions of the sieved material are pressed at about 10 tons per square inch (p.s.i.) in a polished steel mold (die size .228" O.D. x .118" I.D.) to form bodies of a toroidal shape which will have a size after sintering about .200" O.D. x 100" I.D. x .045" thick.

The shaped bodies are placed on a sillimanite setter plate and sintered to maturity, preferably in an electric furnace. The organic binder and lubricant are volatilized first by raising the temperature of the pressed body from room temperature to 300° C. in air and holding at that temperature for about two hours. Complete reaction, crystallization, and sintering of the crystallites is accomplished by raising the temperature in about five hours to 1025° C. and holding at this temperature for about one hour. The heating at 1025° C. is carried in an oxygen atmosphere. During the heating the carbon black is completely volatilized by oxidation, the materials react to produce ferrite crystallites and the crystallites are sintered to a coherent body. The furnace is then shut off and the bodies allowed to cool to room temperature in the furnace in oxygen in about 16 hours.

The magnetic properties of the sintered ferrite bodies prepared according to the example and bodies prepared by a similar method without carbon black are compared in Table I, demonstrating the improvement in the temperature coefficient (T.C.) of bodies prepared by the methods of the invention. All ferrite bodies reported herein were measured at 4.3 megacycles on a Boonton Q meter 190A over the temperature range —50 to +130° C. unless otherwise specified. Temperature coefficients were measured by determining the change in resonance frequency at a constant capacitance.

Table I

|  | With Carbon Black (106 A.) | Without Carbon Black |
|---|---|---|
| T.C. (p.p.m./° C.) | +100 | +1,500 |
| $\mu_0$ | 42 | 35 |
| Q | 124 | 170 |

The frequency characteristic of bodies of the example prepared with carbon black (106 A.) is given in Table II. It will be noted that the characteristics of the material remains substantially constant over a wide range of frequencies.

Table II

| Freq | 2 M.C. | 3 M.C. | 4 M.C. | 5 M.C. | 11 M.C. | 15 M.C. |
|---|---|---|---|---|---|---|
| Q | 115 | 119 | 122.5 | 134 | 148 | 100 |
| $\mu_0$ | 42 | 41.2 | 42 | 42 | 43 | 49 |
| $\mu_0 Q$ | 4,830 | 4,903 | 5,145 | 5,628 | 6,364 | 4,900 |

The effect on the temperature coefficient of initial permeability of substituting various proportions of carbon black in the composition of the example is shown in Table III and FIGURES 1 and 2. It will be noted an improvement in the temperature coefficient is obtained over a very wide range of added proportions of carbon black.

Table III

1025° C. SINTERING

| Percent Carbon Black (106 A.) Added | Q corr. | $\mu_0$ | T. C. p.p.m./° C. |
|---|---|---|---|
| 0 | 170 | 35 | 1,150 |
| 0.1 | 130 | 40 | 100 |
| 0.5 | 94 | 50 | −30 |
| 1.0 | 72 | 70 | −70 |
| 2.0 | 78 | 70 | −100 |
| 5.0 | 110 | 43 | −150 |

1050° C. SINTERING

| | | | |
|---|---|---|---|
| 0 | 159 | 64 | 1,360 |
| 0.1 | 123 | 79 | 540 |
| 0.5 | 91 | 83 | 450 |
| 1.0 | 90 | 73 | 300 |
| 2.0 | 90 | 70 | 150 |
| 5.0 | 88 | 62 | 95 |

Carbon black may be added to any ferrite-producing batch to improve the temperature coefficient of initial permeability and/or other properties as shown on Table VII of the final ferrite body produced therefrom. The proportion used may vary between 0.01 and 10.0 weight percent of the batch weight. The carbon black has a mean particle size up to 1000 A., preferably between 100 and 500 A. The type of carbon black can include blacks made either by the channel or furnace method. The smaller the particle size of the black, however, the greater will be the lowering of the temperature coefficient for the same weight percent added. For example, Table IV gives the results obtained by using the same basic Ni—Zn ferrite sintered at 1025° C. but using different particle size blacks.

Table IV

Mean particle size, A.:     T.C. (p.p.m./° C.)

| Mean particle size, A. | T.C. (p.p.m./° C.) |
|---|---|
| 106 | 100 |
| 230 | 440 |
| 507 | 500 |
| 1796 | 1030 |
| 4724 | 1000 |

It is seen that as the particle size of the carbon black increases, the temperature coefficient of permeability increases. The effective range in weight percent of carbon black added is 0.01 to 10 percent. Amounts greater than 10 percent do not appreciably lower the temperature coefficient since the T.C. versus weight percent carbon black levels off at approximately 5 percent. This is illustrated in FIGURES 1, 2 and 3. A large weight percent (more than 10 weight percent) of carbon black will lower the initial permeability of the sample appreciably since the porosity is appreciably increased in the sintered body.

The other materials of the batch may be oxides (as in the example) or may be materials which decompose upon heating into oxides as other ferrite forming compounds. After the batch is mixed, it may optionally be calcined at temperatures up to 900° C. in air. The final heating temperature for sintering is optimized for each particular composition in the range between 1000° C. and 1375° C.

The synthesis of ferrites of other compositions is similar to the procedure of the example. Some variations and their effects upon the characteristics of the sintered ferrite bodies are given below.

Mixing may be done alternatively by coprecipitating from solution the required proportion of oxides, or other ingredients which upon heating decompose into oxides. Mixtures obtained by this procedure are more intimately mixed, and so they react and crystallize at lower temperatures. The previously described process of mixing the solid ingredients, however is preferred.

The calcining and grinding operations are optional and are used to aid intimate mixing and to help control the shrinkage and porosity of the product. It is essential to control shrinkage in order to obtain products of uniform size and shape. The porosity of the material may be varied by calcining at different temperatures and grinding to different particle sizes, or by adding inorganic "fluxes" such as silicon dioxide, $SiO_2$. The control of porosity is required in order that the material will be in proper form for heat treatment. The importance of this control of porosity will be more fully discussed later.

Binders are added to make the powder particles cohere temporarily after they are pressed into different shapes and before sintering. Lubricants may also be added to facilitate molding. The binders and lubricants added are usually organic compounds which can be volatilized by heating the formed bodies at low temperatures. Some materials which may serve as binders and lubricants are polyvinyl alcohol, diethylene glycol esters of rosin, and methyl esters of rosin.

The pressures used for the molding these materials are less critical than for the molding of powdered iron cores with organic binders. Pressures of about 5 to 10 tons per square inch have been found to be satisfactory. The material may also be extruded. For extrusions the content of the organic binder, lubricant, and water are usually higher, and the correct amount needed must be experimentally determined. In general, different shapes may be produced by processes similar to those in the preparation of ceramics, such as extrusion, hydrostatic pressing and slip casting.

The final reaction, crystallization and sintering, must be controlled carefully. In this procedure, the shaped body is heated to some temperature between 950° C. and 1450° C. in oxygen, air or nitrogen, depending upon the composition chosen and the properties desired. At these high temperatures, the cations and anions of the body diffuse and react, and crystallites of a ferrite of spinel structure are produced. The formation of the ferrite is so rapid that when shaped bodies are heated from one to five minutes at about 1300° C., they show complete spinel X-ray diffraction patterns. Further heating influences chiefly the rate of growth of the crystals. Low temperatures and/or short periods of crystallization give small crystals, and high temperatures and/or long periods of crystallization give large crystals.

The effect of sintering conditions on the ferrite of the example is shown in Table V.

Table V

| Sintering Temperature, degrees | Time, Hours | T.C. in p.p.m./° C. |
|---|---|---|
| 1,025 | 1 | 100 |
| 1,025 | 1½ | 211 |
| 1,025 | 2 | 303 |
| 1,025 | 3 | 593 |
| 1,025 | 4 | 876 |
| 1,050 | 1 | 590 |
| 1,075 | 1 | 609 |
| 1,100 | 1 | 1,111 |
| 1,125 | 1 | 1,410 |
| 1,150 | 1 | 2,900 |

All units are sintered in an oxygen atmosphere to counteract the effect of the reducing action of carbon on the nickel-zinc ferrite.

Because of the partial dissociation of the oxides at the crystallization temperatures, certain compositions require an increase in the positive charge of some or all of the cations for optimum ferromagnetic properties. A controlled cooling treatment will sometimes accomplish this. This process is a reversal of dissociation; that is, oxygen is absorbed by the material, and the oxidation states of the cations are increased. The rate of this absorption is controlled by the porosity and temperature of the material, and by the ambient atmosphere. For the nickel zinc ferrite of the example, satisfactory results may be obtained by turning the furnace off after the required heating at 1025° C., and allowing the material to cool to room temperature in air. Slightly better ferromagnetic properties may be obtained if an atmosphere of oxygen is used and the cooling rate experimentally determined for the optimum property desired.

Some typical ferrite core compositions and their electrical characteristics are shown in Table VI.

Table VI

| Composition | Weight Percent C | Sintering Temp. | T.C. (p.p.m./°C.) | μ₀ | Q |
|---|---|---|---|---|---|
| $Co_2O_{3(0.005)}$ $NiO_{(0.32)}$ $ZnO_{(0.17)}$ $Fe_2O_{3(0.50)}$ +$MoO_{3(0.005)}$ | 0 | 1,025 | 1,247 | 30 | 160 |
| $Co_2O_{3(0.005)}$ $NiO_{(0.32)}$ $ZnO_{(0.17)}$ $Fe_2O_{3(0.50)}$ +$MoO_{3(0.005)}$ | 0.5 | 1,025 | 450 | 28 | 190 |
| $Co_2O_{3(0.005)}$ $NiO_{(0.22)}$ $ZnO_{(0.27)}$ $Fe_2O_{3(0.50)}$ +$MoO_{3(0.005)}$ | 0 | 1,000 | 830 | 40 | 120 |
| $Co_2O_{3(0.005)}$ $NiO_{(0.22)}$ $ZnO_{(0.27)}$ $Fe_2O_{3(0.050)}$ +$MoO_{3(0.005)}$ | 0.5 | 1,000 | 44 | 35 | 140 |
| $Co_2O_{3(0.005)}$ $NiO_{(0.22)}$ $ZnO_{(0.27)}$ $Fe_2O_{3(0.50)}$ +$MoO_{3(0.005)}$ | 1.0 | 1,000 | −38 | 30 | 145 |
| $Co_2O_{3(0.005)}$ $NiO_{(0.22)}$ $ZnO_{(0.27)}$ $Fe_2O_{3(0.50)}$ +$MoO_{3(0.005)}$ | 0 | 1,025 | 811 | 40 | 130 |
| $Co_2O_{3(0.005)}$ $NiO_{(0.22)}$ $ZnO_{(0.27)}$ $Fe_2O_{3(0.50)}$ +$MoO_{3(0.005)}$ | 0.01 | 1,025 | 243 | 50 | 115 |

Effects of carbon black in improving properties of other systems are shown in Table VII.

Table VII

| Composition | Weight Percent Carbon | Properties |
|---|---|---|
| $MnO_{(0.22)}$ $MgO_{(0.38)}$ $Fe_2O_{3(0.40)}$ | 0 | Squareness≈.772. |
| $MnO_{(0.22)}$ $MgO_{(0.38)}$ $Fe_2O_{3(0.40)}$ | 1 | Squareness≈.895. |
| $NiO_{(0.50)}$ $Fe_2O_{3(0.50)}$ * | 0 | Frequency change 25° to 85° C. −120 cycles per second. |
| $NiO_{(0.50)}$ $Fe_2O_{3(0.50)}$ * | 1 | Frequency change 25° to 85° C. 300 cycles per second. |

*Magnetostrictive rods 0.325 inch long by 0.036 inch diameter.

What is claimed is:

1. A method for preparing a magnetic body of sintered ferrite crystallites comprising mixing a batch of raw materials in the desired proportions to produce a ferrite from the group consisting of nickel ferrite, nickel-zinc ferrite, and magnesium-manganese ferrite and including between 0.01 and 10 weight percent carbon black having a mean particle size up to 1000 A., forming a portion of said mixture to a desired shape, and then heating the shaped mixture at temperatures between 950° and 1450° C. in an oxidizing atmosphere to react said raw materials to produce crystallites to said ferrite and to sinter said crystallites into a coherent body.

2. A ferrite body prepared according to the method of claim 1.

3. A method for preparing a magnetic body of sintered ferrite crystallites comprising mixing a batch of raw materials in proportions to yield a nickel zinc ferrite upon sintering and including between 0.01 and 10 weight percent carbon black having a mean particle size up to 1000 A., forming a portion of said mixture to a desired shape, and then sintering the shaped mixture at temperatures between 1000° and 1375° C. in an oxidizing atmosphere to react said materials to produce crystallites of said ferrite and to sinter said crystallites into a coherent body.

4. A method for preparing a magnetic body of sintered ferrite crystallites comprising mixing a batch of raw materials in the proportions 0.276 mol NiO 0.222 mol ZnO, 0.002 mol CoO, 0.500 mol $Fe_2O_3$ and 0.005 mol $MoO_3$, mixing into said batch about 0.1 weight percent with respect to the weight of said batch of carbon black having a mean particle size up to 1000 A., forming a portion of said mixture to a desired shape, and then sintering said shaped mixture at temperatures between 1000° and 1375° C. in an oxidizing atmosphere to react said materials to produce crystallites of said ferrite and to sinter said crystallites into a coherent body.

5. A method for preparing a magnetic body of sintered ferrite crystallites comprising mixing a batch of raw materials in the proportions 0.276 mol NiO, 0.222 mol ZnO, 0.002 mol CoO, 0.500 mol $Fe_2O_3$ and 0.005 mol $MoO_3$, mixing into said batch about 0.1 weight percent with respect to the weight of said batch of carbon black having a mean particle size between 100 and 500 A. forming a portion of said mixture into a desired shape, and then heating said shaped mixture at a temperature of about 1025 to 1200° C. for about four hours in an oxidizing atmosphere to react said materials to produce crystallites of said ferrite and to sinter said crystallites into a coherent body.

6. A ferrite body prepared according to the method of claim 5.

7. A method for preparing a magnetic body of sintered ferrite crystallites comprising mixing a batch of raw materials in the proportions 0.276 mol NiO, 0.222 mol ZnO, 0.002 mol CoO, 0.500 mol $Fe_2O_3$ and 0.005 mol $MoO_3$, mixing into said batch about 0.1 weight percent with respect to the weight of said batch of carbon black having a mean particle size between 100 and 500 A., forming a portion of said mixture into a desired shape, and then sintering said shaped mixture at a temperature of about 1025 to 1200° C. for about four hours in oxygen to react said materials to produce crystallites of said ferrite and to sinter said crystallites into a coherent body.

8. In a method for preparing a magnetic body of sintered ferrite crystallites from the group consisting of nickel ferrite, nickel-zinc ferrite, and magnesium-manganese ferrite, the steps of adding carbon black having a mean particle size up to 1000 A. in a proportion between 0.01 and 10 weight percent to a raw batch containing materials in proportions necessary to produce said ferrite and then sintering said batch at temperatures between 950° and 1450° C. in an oxidizing atmosphere.

(References on following page)

References Cited in the file of this patent

UNITED STATES PATENTS

| | | |
|---|---|---|
| 2,597,236 | Friend | May 20, 1952 |
| 2,659,698 | Berge | Nov. 17, 1953 |
| 2,723,239 | Harvey | Nov. 8, 1955 |
| 2,736,708 | Crowley et al. | Feb. 28, 1956 |

FOREIGN PATENTS

| | | |
|---|---|---|
| 735,375 | Great Britain | Aug. 17, 1955 |
| 737,284 | Great Britain | Sept. 21, 1955 |
| 1,048,444 | France | Aug. 5, 1953 |
| 184,198 | Austria | Dec. 27, 1955 |

OTHER REFERENCES

Harvey et al.: RCA Review, September 1950, pages 344–349.

Gorter: Proceedings of the IRE, December 1955, page 1953.